United States Patent
Durst et al.

(10) Patent No.: US 8,016,938 B2
(45) Date of Patent: Sep. 13, 2011

(54) STRUCTURES AND COMPONENTS COMPRISING BLAST-RESISTANT CONCRETE ALSO SUITABLE FOR LIMITING PENETRATION OF BALLISTIC FRAGMENTS

(75) Inventors: Bartley P. Durst, Clinton, MS (US); Billy D. Neeley, Vicksburg, MS (US); Edward F. O'Neil, Vicksburg, MS (US); Toney K. Cummins, Vicksburg, MS (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 12/775,873

(22) Filed: May 7, 2010

(65) Prior Publication Data

US 2010/0221465 A1    Sep. 2, 2010

Related U.S. Application Data

(62) Division of application No. 11/390,084, filed on Mar. 28, 2006, now Pat. No. 7,744,690.

(51) Int. Cl.
*C04B 7/02* (2006.01)

(52) U.S. Cl. ........ 106/713; 106/644; 106/737; 428/703; 264/333; 264/DIG. 43

(58) Field of Classification Search ............ 264/333, 264/DIG. 43; 106/713, 644, 737; 428/703
See application file for complete search history.

(56) References Cited

U.S. PATENT DOCUMENTS

| | | | |
|---|---|---|---|
| 3,972,969 | A | 8/1976 | Rio et al. |
| 4,193,809 | A | 3/1980 | Ferm et al. |
| 4,193,810 | A | 3/1980 | Ferm |
| 4,193,811 | A | 3/1980 | Ferm |
| 4,198,245 | A | 4/1980 | Ferm et al. |
| 4,599,211 | A | 7/1986 | Wise et al. |
| 4,687,614 | A | 8/1987 | Suzuki et al. |
| 4,749,413 | A | 6/1988 | Tomic |
| 4,821,483 | A | 4/1989 | Adams |
| 5,187,882 | A | 2/1993 | Leach |
| 5,296,187 | A | 3/1994 | Hackman |
| 5,457,263 | A | 10/1995 | Berglund |
| 5,492,659 | A | 2/1996 | Collepardi |
| 5,885,510 | A | 3/1999 | Kriechbaum et al. |
| 5,954,872 | A | 9/1999 | Benson |
| 6,733,583 | B2 | 5/2004 | Frailey et al. |
| 6,936,098 | B2 | 8/2005 | Ronin |
| 7,744,690 | B2 * | 6/2010 | Durst et al. ............... 106/644 |
| 2007/0228612 | A1 | 10/2007 | Durst et al. |
| 2007/0264527 | A1 | 11/2007 | Sykes et al. |

* cited by examiner

*Primary Examiner* — Paul Marcantoni
(74) *Attorney, Agent, or Firm* — Earl H. Baugher, Jr.

(57) ABSTRACT

Concrete structures and components with improved strength and toughness. A uniform mix of first constituents comprises: cement of Blaine fineness of 280-360 $m^2/kg$; sand at a mass ratio of 0.75-1.25 of the cement; silica fume at a mass ratio of 0.15-0.4 of the cement; silica flour at a mass ratio of 0.15-0.3 of the cement; and microinclusions at a mass ratio up to 0.35 of the cement. This is then mixed with a blend of second constituents comprising a specified amount of an HRWRA and an amount of water at a mass ratio of 0.2-0.35 of the cement. This is mixed sufficiently to form a uniform cement-based paste to which an amount of macrofibers at a mass ratio of up to 0.35 of the cement is added to yield a uniform product. Nanoinclusions may be added to improve crack resistance and increase density.

25 Claims, 1 Drawing Sheet

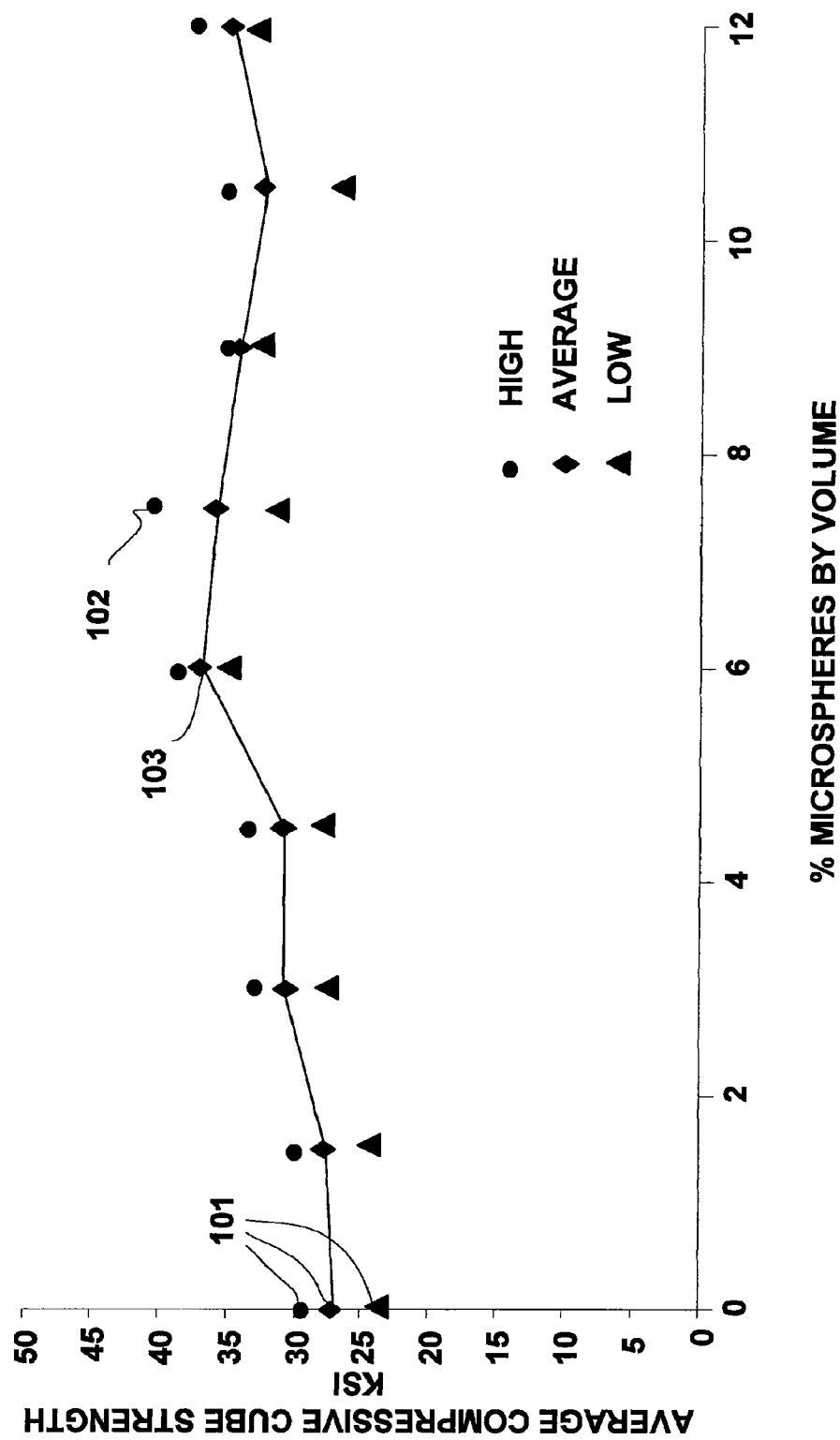

STRUCTURES AND COMPONENTS COMPRISING BLAST-RESISTANT CONCRETE ALSO SUITABLE FOR LIMITING PENETRATION OF BALLISTIC FRAGMENTS

RELATED APPLICATIONS

This application is a division of Ser. No. 11/390,084 filed Mar. 28, 2006, now U.S. Pat. No. 7,744,690 B2, *Blast-Resistant Concrete Also Suitable for Limiting Penetration of Ballistic Fragments*, to Durst et al., Jun. 29, 2010, which is incorporated herein by reference together with United States patent application publication no. 2007/0264527 A1, published 15 Nov. 2000, *System and Method for Increasing the Bond Strength between a Structural Material and its Reinforcement*, by Sykes et al.

STATEMENT OF GOVERNMENT INTEREST

Under paragraph 1(a) of Executive Order 10096, the conditions under which this invention was made entitle the Government of the United States, as represented by the Secretary of the Army, to the entire right, title and interest therein of any patent granted thereon by the United States. This patent and related ones are available for licensing. Contact Phillip Stewart at 601 634-4113.

BACKGROUND

The properties of concrete depend on the mixture (quantities) and quality of its components. Because cement, typically portland cement, is the active component of concrete and usually has the greatest unit cost, its selection and proper use are important in obtaining the balance of properties meeting user needs.

Type I and type I/II portland cements are the most popular cements used. However, some applications require other types for meeting user requirements. The need for high early strength cements in pavement repairs and the use of blended cements with aggregates susceptible to alkali-aggregate reactions are examples of such applications. The choice involves the correct knowledge of the relationship between cement and performance and, in particular, between type of cement and durability of the resultant concrete.

ASTM C 150 defines portland cement as "hydraulic cement (cement that not only hardens by reacting with water but also forms a water-resistant product) produced by pulverizing clinkers consisting essentially of hydraulic calcium silicates, usually containing one or more of the forms of calcium sulfate as an interground addition." Clinkers are nodules (approximate diameters, 5-25 mm [0.2-1.0 inch]) of a sintered material that is produced when a raw mixture of predetermined composition is heated to high temperature. The low cost and widespread availability of limestone, shales, and other naturally occurring materials make portland cement one of the least expensive building materials widely used over the last century.

Different types of portland cement meet physical and chemical requirements for specific purposes, such as durability and high early strength. Eight types of cement are covered in ASTM C 150 and AASHTO M 85. These types and their uses are listed in Table 1.

TABLE 1

Portland Cement Types and Uses

| CEMENT TYPE | USE |
|---|---|
| I[1] | General purpose cement, when there are no extenuating conditions |
| II[2] | Aids in providing moderate resistance to sulfate attack |
| III | When high-early strength is required |
| IV[3] | When a low heat of hydration is desired (in massive structures) |
| V[4] | When high sulfate resistance is required |
| IA[4] | A type I cement containing an integral air-entraining agent |
| IIA[4] | A type II cement containing an integral air-entraining agent |
| IIIA[4] | A type III cement containing an integral air-entraining agent |

[1]Cements that simultaneously meet requirements of Type I and Type II, commonly referred to as Type I/II, are also widely available.
[2]Type II low alkali (total alkali as $Na_2O < 0.6\%$) is often specified in regions where aggregates susceptible to alkali-silica reactivity are employed.
[3]Type IV cements are available only on special request.
[4]These cements are in limited production and not widely available.

More than 92% of portland cement produced in the United States is Type I and II (or Type I/II). Type III accounts for about 3.5% of cement production. U.S. Department of the Interior, Bureau of Mines, *Cement Mineral Yearbook*, Washington, D.C., 1989. Type IV cement is available only on special request, and Type V may also be difficult to obtain, accounting for less than 0.5% of production.

If a given type of cement is not available, comparable results can frequently be obtained by using modifications of available types. High early strength concrete, for example, may be made by using a higher content of Type I when Type III cement is not available or by using admixtures such as chemical accelerators or high-range water reducers (HRWR). National Material Advisory Board, *Concrete Durability: A Multi-Billion Dollar Opportunity*, NMAB-437, Washington, D.C., National Academy Press, 1987.

The composition of portland cements is what distinguishes one type of cement from another. ASTM C 150 and AASHTO M 85 give the standard chemical requirements for each type. The phase compositions in portland cement are denoted by ASTM as tricalcium silicate ($C_3S$), dicalcium silicate ($C_2S$), tricalcium aluminate ($C_3A$), and tetracalcium aluminoferrite ($C_4AF$). Note that these compositions occur at a phase equilibrium of all components in the mix and do not reflect effects of burn temperatures, quenching, oxygen availability, and other real-world kiln conditions. The actual components are often complex chemical crystalline and amorphous structures, denoted by cement chemists as "alite" ($C_3S$), "belite" ($C_2S$), and various forms of aluminates. The behavior of each type of cement depends on the proportions of these components.

Studies have shown that early hydration of cement is principally controlled by the amount and activity of $C_3A$, balanced by the amount and type of sulfate interground with the cement. $C_3A$ hydrates rapidly and will influence early bonding characteristics. Abnormal hydration of $C_3A$ and poor control of this hydration by sulfate can lead to such problems as flash set, false set, slump loss, and cement-admixture incompatibility. Previte, R., *Concrete Slump Loss*, ACI Journal Proceedings 74 (8):361-67, 1977; Whiting, D., *Permeability of Selected Concretes*, ACI special publication, Permeability of Concrete SP-108: 195-222, 1988; Meyer, L. M. and W. F. Perenchio, *Theory of Concrete Slump Loss as Related to Use of Chemical Admixtures*, Concrete International, Design and Construction 1 (1):36-43, 1979.

Development of the internal structure of hydrated cement, referred to as the microstructure, occurs after the concrete has set and continues for months, and often years, after placement. The microstructure of the cement as it hydrates determines the mechanical behavior and durability of the resultant concrete. In terms of cement composition, $C_3S$ and $C_2S$ have the primary influence on long-term development of structure, although aluminates may contribute to formation of compounds such as ettringite (sulfoaluminate hydrate), which may cause expansive disruption of concrete. Cements high in $C_3S$, in particular those that are finely ground to less than about 40 microns, hydrate rapidly and lead to high early strength. However, hydration products adversely affect hydration as the concrete ages, in some cases leading to an ultimate strength lower than desired. Cements high in $C_2S$ hydrate slowly, leading to a dense ultimate structure and a high long-term strength. The relative ratio of $C_3S$ to $C_2S$, and the overall fineness of cements, has been steadily increasing over the past few decades. This ability to achieve desired strengths at a higher workability, and hence a higher water content (w/c), may account for many durability problems, as it is now established that higher w/c invariably leads to higher permeability in the concrete. Ruettgers, A., E. N. Vidal, and S. P. Wing, *An Investigation of the Permeability of Mass Concrete with Particular Reference to Boulder Dam*, ACI Journal Proceedings 31:382-416, 1935; Whiting, 1988.

One of the major aspects of cement chemistry that concerns users is the influence of chemical admixtures on portland cement. Since the early 1960's most states have permitted or required the use of water-reducing and other admixtures in highway pavements and structures. Mielenz, R., *History of Chemical Admixtures for Concrete*, Concrete International: Design and Construction 6 (4):40-54 (April), 1984. A wide variety of chemical admixtures have been introduced to the concrete industry recently, and engineers are increasingly concerned about the effects of these admixtures on performance.

Considerable research dealing with admixtures has been conducted. Air-entraining agents are widely used in the highway industry in North America, where concrete is subjected to repeated freeze-thaw cycles. Air-entraining agents have no appreciable effect on the rate of hydration of cement or on the chemical composition of hydration products. Ramachandran, V. S. and R. F. Feldman, *Cement Science*, In Concrete Admixtures Handbook: Properties, Science, and Technology, ed. V. Ramachandran, 1-54, Park Ridge, N.J., Noyes Publications, 1984. However, an increase in cement fineness or a decrease in cement alkali content generally increases the amount of an admixture required for a given air content. ACI Comm. 225R 1985. Water reducers or retarders influence cement compounds and their hydration. Lignosulfonate-based admixtures affect the hydration of $C_3A$, which controls the setting and early hydration of cement. $C_3S$ and $C_4AF$ hydration is also influenced by water reducers. Ramachandran and Feldman (1984).

ASTM C 150 and AASHTO M 85 specify certain physical requirements for each type of cement. These properties include 1) fineness, 2) soundness, 3) consistency, 4) setting time, 5) compressive strength, 6) heat of hydration, 7) specific gravity, and 8) loss of ignition. Each one of these properties has an influence on performance. The fineness of the cement, for example, affects the rate of hydration. Greater fineness increases the surface available for hydration, causing greater early strength and more rapid generation of heat, e.g., the fineness of Type III is higher than that of Type I cement. U.S. Department of Transportation, Federal Highway Administration, *Portland Cement Concrete Materials Manual*, Report no. FHWA-Ed-89-006 (August). Washington, D.C., FHWA, 1990.

ASTM C 150 and AASHTO M 85 specifications are similar except with regard to fineness of cement. AASHTO M 85 requires coarser cement that results in high ultimate strengths and low early strength gain. The Wagner Turbidimeter and the Blaine air permeability test for measuring cement fineness are both required by the American Society for Testing Materials (ASTM) and the American Association for State Highway Transportation Officials (AASHTO). Average Blaine fineness of modern cement ranges from 3,000 to 5,000 $cm^2/g$.

Soundness, i.e., the ability of hardened cement-based paste to retain its volume after setting, is characterized by measuring the expansion of mortar bars in an autoclave. ASTM C 191, AASHTO T 130. The compressive strength of 50-mm (2-inch) mortar cubes after seven days, as measured by ASTM C 109, should be greater than 19.3 MPa (2,800 psi) for Type I cement. Other physical properties included in both ASTM C 150 and AASHTO M 95 are specific gravity and false set. False set is a significant loss of plasticity shortly after mixing due to the formation of gypsum or the formation of ettringite. In many cases, workability may be restored by remixing the concrete before casting.

Effects of the type of cement on the most important concrete properties are presented in Table 2. Cement composition and fineness control concrete properties. Fineness of cement affects the placeability, workability, and water content of a mixture much like the amount of cement used does.

TABLE 2

Effects of Cement Property on Concrete Characteristics

| CHARACTERISTIC | CEMENT PROPERTY |
| --- | --- |
| Placeability | amount, fineness, setting characteristics |
| Strength | composition ($C_3S$, $C_2S$ and $C_3A$), loss on ignition, fineness |
| Drying Shrinkage | $SO_3$ content, composition |
| Permeability | composition, fineness |
| Resistance to Sulfate | $C_3A$ content |
| Alkali Silica Reactivity | alkali content |
| Corrosion of Embedded Steel | composition (esp. $C_3A$ content) |

Cement composition affects the permeability of concrete by controlling the rate of hydration. However, the ultimate porosity and permeability are unaffected by changes in rate. ACI Committee 225R, *Guide to the Selection and Use of Hydraulic Cements*, AC225R-85, American Concrete Institute, Detroit, Mich., 1985; Powers, T. C., L. E. Copeland, J. C. Hayes, and H. M. Mann, *Permeability of Portland Cement Paste*, ACI Journal Proceedings 51 (3):285-98, 1954. Coarse cement tends to produce pastes with higher porosity than that produced by fine cement. Powers et al. 1954. Cement composition has only a minor effect on freeze-thaw resistance. Corrosion of embedded steel has been related to $C_3A$ content. Verbeck, G. J., *Field and Laboratory Studies of the Sulfate Resistance of Concrete*, in *Performance of Concrete Resistance to Sulfate and Other Environmental Conditions*; Thorvaldson Symposium, 113-24, University of Toronto Press, Toronto, CA, 1968. The higher the $C_3A$ content, the more chloride that is tied into chloroaluminate complexes and unavailable for catalysis of the corrosion process.

Blended cement, as defined in ASTM C 595, is a mixture of portland cement and blast furnace slag (BFS) or a "mixture of portland cement and a pozzolan (most commonly fly ash)." The use of blended cements in concrete reduces mixing water and bleeding, improves finishability and workability, enhances sulfate resistance, inhibits the alkali-aggregate reaction, and lessens heat evolution during hydration, thus moderating the chances for thermal cracking on cooling. Blended cement types and blended ratios are given in Table 3.

TABLE 3

Blended Cement Types and Blended Ratios

| TYPE | BLENDED INGREDIENTS |
|---|---|
| IP | 15-40% by weight of Pozzolan (fly ash) |
| I(PM) | 0-15% by weight of Pozzolan (modified) |
| P | 15-40% by weight of Pozzolan |
| IS | 25-70% by weight of blast furnace slag |
| I(SM) | 0-25% by weight of blast furnace slag (modified) |
| S | 70-100% by weight of blast furnace slag |

Expansive cement, i.e., cement employing expansive components, is a cement containing hydraulic calcium silicates, such as those characteristic of portland cement, which, upon being mixed with water, forms a paste. During the early hydrating period after setting, expansive cement-based paste increases in volume significantly more than does portland cement-based paste. Expansive cement is used to compensate for volume decrease due to shrinkage and to induce tensile stress in reinforcement.

Expansive cement-based concrete used to minimize cracking caused by drying shrinkage in concrete slabs, pavements, and structures is termed shrinkage-compensating concrete. ACI Committee 223, *Standard Practice for the Use of Shrinkage-Compensating Concrete*, ACI 223-83, American Concrete Institute, Detroit, Mich., 1983.

Self-stressing concrete is another expansive cement-based concrete in which the expansion, if restrained, induces a compressive stress high enough to result in a significant residual compression in the concrete after drying shrinkage has occurred.

Three kinds of expansive cement are defined in ASTM C 845:

Type K: Contains anhydrous calcium aluminate;

Type M: Contains calcium aluminate and calcium sulfate; and

Type S: Contains tricalcium aluminate and calcium sulfate. Only Type K is used in any significant amount in the United States.

Concrete placed in an environment where it begins to dry and lose moisture will begin to shrink. The amount of drying shrinkage that occurs in concrete depends on the characteristics of the materials, mixture proportions, and placing methods. When pavements or other structural members are restrained by subgrade friction, reinforcement, or other portions of the structure, drying shrinkage will induce tensile stresses. These drying shrinkage stresses usually exceed the concrete tensile strengths, causing cracking. The advantage of using expansive cements is to induce stresses large enough to compensate for drying shrinkage stresses and minimize cracking. ACI Comm 223 1983; Hoff, G. C. et al., *Identification of Candidate Zero Maintenance Paving Materials*, 2 vols, Report no. FHWA-RD-77-110 (May), U.S. Army Engineer Waterways Experiment Station, Vicksburg, Miss., 1977.

Physical and mechanical properties of shrinkage compensating concrete are similar to those of portland cement concrete (PCC). Tensile, flexural, and compressive strengths are comparable to those in PCC. Air-entraining admixtures are as effective with shrinkage-compensating concrete as with portland cement in improving freeze-thaw durability.

Some water-reducing admixtures may be incompatible with expansive cement. Type A water-reducing admixture, for example, may increase the slump loss of shrinkage-compensating concrete. Call, B. M., *Slump Loss with Type "K" Shrinkage Compensating Cement, Concrete, and Admixtures*, Concrete International: Design and Construction, January: 44-47, 1979. Fly ash and other pozzolans may affect expansion and may also influence strength development and other physical properties.

In Japan, admixtures containing expansive compounds are used instead of expansive cements. Tsuji and Miyake described using expansive admixtures in building chemically pre-stressed precast concrete box culverts. Tsuji, Y. and N. Miyake, *Chemically Prestressed Precast Concrete Box Culverts*, Concrete International: Design and Construction 10 (5):76-82 (May), 1988. Bending characteristics of chemically pre-stressed concrete box culverts were identical to those of reinforced concrete units of greater thickness. Tsuji and Miyake (1988).

Very-high-strength concrete (VHSC) is made from the same general constituents as conventional concrete, i.e., cementitious material, water, aggregate, and admixture for removing air and water from the mix. Careful selection of constituents and proportions, as well as proper processing, results in significant increases in both tensile and compressive strength, toughness, durability, and reduced water permeability. Physical and mechanical properties may be improved by the application of heat and pressure during casting and curing. Defining characteristics of VHSC include:

improved homogeneity through particle size and material selection;

increased density by optimization of particle size and mixing energy and technology;

improved strength by maximizing reactive materials and minimizing water content;

increased microstructure homogeneity by application of pressure before setting and post-set heat treatment; and increased tensile strength, toughness, and ductility by incorporation of reinforcing fibers ("macro" fibers), reinforcing microfibers, or both.

Conventional concrete is very heterogeneous incorporating constituents from fine cement to coarse aggregates. Under a system of forces, each of these constituents deforms at its own rate. The differential movement of these components produces strain between the constituents that begin the process of tensile fracture when the strain exceeds the capacity of the concrete. VHSC comprises particles of similar moduli and size, contributing to a greater homogeneity of the concrete and reducing any differential tensile strain, thereby ultimately increasing the load-carrying capacity. Conventional formulations of VHSC often incorporate macro-length reinforcing fibers (macrofibers) to enhance "toughness" and have a rheology that requires retention in formwork until they are hydrated (hardened).

In selecting and mixing constituents for VHSC, particle-packing techniques are employed to maximize the solids per unit volume to achieve an optimally high "denseness," i.e., the relative amount of volume attributed to solids. The largest particle in VHSC is the aggregate, e.g., sand, having a maximum particle size of 4.75 mm. The next largest size is that of the cement at between 10 and 100 microns ($\mu m$). The smallest size used in conventional VHSC is that of silica flume at about 0.1 $\mu m$. The higher the "denseness," and thus, the greater the strength, the lower the permeability because the voids are fewer and smaller.

The strength of VHSC is further enhanced via incorporation of pozzolanics, such as fine siliceous or aluminous powders. These react to form hydration products. VHSC formulations employ materials with a high silica content, such as low carbon silica flume, to achieve high strength. These materials include chemically active silica that facilitates production of calcium-silicate-hydrate (C-S-H), bonding the other constituents together. Large amounts of C-S-H increase the strength of the binder, improving the bond between cement and aggregate.

To optimize a VHSC formulation, the water to cement (w/c) ratio must be controlled. For example, water needed to hydrate all of the portland cement in a mix requires a w/c ratio of about 0.4. Water not chemically or physically combined in the hydration or pozzolanic reactions weakens the resultant concrete. Thus, the volume of water in a VHSC mix is kept lower than that needed to hydrate all the cement, insuring that the water is consumed in the hydration and pozzolanic reactions. Because this low volume of water may affect workability of the mix, at least one high-range water-reducing admixture (HRWRA) may be added.

Conventional VHSC may exhibit an ultimate compressive strength near 175 MPa when processed at ambient temperature. Curing at 90° C. for a few days yields compressive strength greater than 200 MPa. Further, compression of the product during early hydration to remove excess air and water, and heating up to 400° C. on a reasonable schedule, yields VHSC having a compressive strength of 800 MPa.

The tensile strength of conventional VHSC may be made greater than conventional concrete. The tensile strength of VHSC with a compressive strength of 180 MPa may be about 10 MPa, but may be enhanced via use of steel reinforcing fibers, typically macrofibers. These fibers increase the first-crack load, the ultimate load-bearing capacity and significantly increase flexural toughness.

Conventional VHSC exhibits a near linear stress-strain relationship to failure as fabricated without reinforcing fibers, typically macrofibers, exhibiting a typical fracture energy of less than 140 J/m$^2$. Incorporating macrofibers in a VHSC improves response in the post-first-crack region of the load-to-failure cycle. Best results have been seen using hooked-end steel macrofibers of about 0.5 mm diameter. The large number of small macrofibers crossing the path of potential cracks, coupled with the good bond between the macrofibers and the matrix, greatly increase toughness. Cargile, Dr. J. Donald et al., *Very-High-Strength Concretes for Use in Blast- and Penetration-Resistant Structures*, The AMPTIAC Quarterly, Vol. 6, No. 4, 1999.

Field tests subjected thin concrete panels to fragment penetration. These panels were made from predecessor formulations to those of embodiments of the present invention. The panels experienced high resistance to dynamic loads of blast and penetration. O'Neil, E. F. et al., *Tensile Properties of Very-High-Strength Concrete for Penetration Resistant Structures*, Shock and Vibration, Vol. 6, Nos. 5, 6, pp. 237-245, 1999; Neeley, B. D. and D. M. Walley, *VHS Concrete*, The Military Engineer, Vol. 87(572), pp. 36-37, 1995; O'Neil, E. F. et al., *Development of Very-High-Strength and High-Performance Concrete Materials for Improvement of Barriers Against Blast and Projectile Penetration*, The 24$^{th}$ Army Science Conference, Presentation FO-01, November 29-Dec. 2, 2004, Orlando Fla. Performance in these tests indicate embodiments of the present invention are even more suitable for resisting high wind loads and flying debris (to include ballistic fragments), such as may be generated by hurricanes and tornadoes. Select embodiments of the present invention envision inexpensive concrete products that provide dynamic resistance to blast and penetration forces at a level equivalent to more expensive materials, such as ceramics.

BRIEF DESCRIPTION OF THE DRAWINGS

The figure summarizes in graph form test results for various mixes of Very High Strength Concrete (VHSC) blended with amounts of 3M® microspheres up to 12% by volume.

DETAILED DESCRIPTION

In select embodiments of the present invention, structures and components are built using a superior concrete, marketed as COR-TUF™. COR-TUF™ provides a combination of high strength and superior energy absorbing capacity, or "toughness," against blast and ballistic penetration. Toughness is a measure of the amount of energy required to be expended to open cracks in the matrix under tensile loading. It is an important metric for objects that suffer impact.

Select embodiments of the present invention provide formulations and methods of fabrication for producing an optimum combination of increased strength and toughness in a custom concrete component that may be formulated with diverse types and lengths of both macrofibers and microinclusions, such as micro-sized fibers (microfibers), or nanoinclusions (some available as nanofibers and others as nanoparticles). Select embodiments of the present invention may incorporate high-performance materials such as woven mats of small diameter high-strength wire comprising steel or synthetics such as carbon fiber, fiberglass, and aramids, to further enhance performance. In select embodiments of the present invention, un-hydrated cement-based paste may be mixed in a "dough-like" consistency enabling it to be extrusion molded, spun-cast, or formed under external pressure into shapes suitable for protective applications, such as components for improving blast resistance of structures, for fabricating inexpensive alternatives to ceramic armor, and the like. This stiff mixture holds its shape during production and curing without the need of formwork, enabling it to be produced on an assembly line.

Because of superior performance, select embodiments of the present invention are suitable for commercial use as structural members and panels resistant to natural forces, such as debris impact from tornados and hurricanes, as well as for security applications, such as bank vaults and armored protective enclosures. Select embodiments of the present invention obtain superior strength and toughness qualities through, among other considerations, proper selection of the type and quantity of constituents, including macro-, micro- and nano-sized inclusions of specified composition.

Macro- and microfiber reinforcement contributes to an optimum combination of strength and toughness. Macro-fibers address bridging of macro-cracks and micro-fibers address bridging of micro-cracks.

Initial mixes of select embodiments of the present invention comprise: a cement of Blaine fineness at about 280 to about 360 m$^2$/kg; sand at a mass ratio of about 0.75 to about 1.25 of the mass of cement; silica fume at a mass ratio of about 0.15 to about 0.4 of the mass of cement; silica flour at a mass ratio of about 0.15 to about 0.3 of the mass of cement; at least one HRWRA, such as GLENIUM® 3030 NS, Degussa Admixtures, Inc.; ADVA® 170 and ADVACAST® 500, W.R. Grace & Co., and PLASTOL, EUCON 37 and EUCON 1037, Euclid Chemical Co., in amounts approximately commensurate with the recommendations of the manufacturer; macrofibers, either metal (e.g., low carbon or stainless), mineral (e.g., glass or asbestos), synthetic organic (e.g., carbon, cellulose, or polymeric), or natural organic (e.g., sisal) at a mass ratio of up to about 0.35 of the mass of cement; and water at a mass ratio of about 0.2 to about 0.35 of the mass of cement. In select embodiments of the present invention, macrofibers may be omitted from the above recipe. In select embodiments of the present invention, an HRWRA may be added in specified amounts of about 3-20 fluid ounces per 100 lbs of the cement-based paste.

For select embodiments of the present invention, constituents may vary within the initial mix. For example, the cement may be portland cement of high-silica content, i.e., a calcium to silica ratio (Ca/Si) of less than about 3.1. Silica fume may be incorporated, of preferably at least 96% silica with a carbon content of less than about 4%. Silica flour may be incorporated, preferably as pure, finely crushed silica of less than about 40 microns. Macrofibers may be selected from the group consisting of: steel fibers, synthetic fibers, polymer fibers, organic fibers, natural inorganic fibers, and the like, and combinations thereof. Preferably, macrofibers are provided in lengths between about 18 to about 38 mm (0.75-1.5 in.) and in diameters between about 0.38 to about 0.63 mm (0.015-0.025 in.). The ends of the macrofibers may be hooked, straight, or "bulbed." Special treatment of the macrofibers, such as bonding silica fume or glass frit to the surface or roughening the surface, enhances the bond between the cement-based paste and the macrofibers. An example of such treatment is described in U.S. patent application Ser. No. 11/234,184, filed Sep. 26, 2005, Publication no. 2007/0264527 A1, published 15 Nov. 2007, *System and Method for Increasing the Bond Strength between a Structural Material and its Reinforcement*, by Sykes et al. incorporated herein by reference.

Mats comprising continuous, high-strength steel strands of diameter less than about 2.5 mm (0.1 in.) may be embedded in or bonded to the tensile-load carrying face of the mix to add strength and toughness. The high-range water-reducing admixture (HRWRA) may be a polycarboxylate type material, added in amounts approximating recommendations of the manufacturer.

In select embodiments of the present invention, microinclusions and nanoinclusions, also termed dispersions, are incorporated to increase the toughness of the mix (cement-based paste) at the micro (or nano) scale by acting as microcrack bridging mechanisms that truncate or delay the growth of micro cracks in the mix and at the nanoscale by filling the void spaces between larger particles making the material more dense. Micro- and nanoinclusions may be selected from the group comprising: fiber-like microinclusions, spherical microinclusions, polyhedron microinclusions, fiber-like nanoinclusions, spherical nanoinclusions, polyhedron nanoinclusions, and the like, and combinations thereof. In select embodiments of the present invention, microinclusions may have a longest dimension from about one micron to about 150 microns.

Microinclusions may be selected from the group of materials comprising: metals, ceramics, organics, natural minerals, and the like, and combinations thereof. Specific configurations of these microinclusion and nanoinclusion materials may be selected from the group comprising: steel shavings, ceramic whiskers, ceramic spheres, mineral fibers, wollastonite, carbon fibers, carbon nanotubes, and the like, and combinations thereof. Further, nanoinclusions may be selected from the class of materials of a colloidal nature such as colloidal silica.

In select embodiments of the present invention, the rheology of the constituents in the mix may range from highly flowable to that of stiff dough or clay, depending on the concentration of each of the constituents. The rheology of a particular mix is dependent on the volume and surface area of dry constituents (including the microinclusions and select nanoinclusions), the volume of water, and the mass of the HRWRA used. For example, a stiff dough-like mixture suitable for extruding or spin-casting contains a relatively high volume of dry constituents, a relatively low volume of water and a relatively moderate to low mass of an HRWRA. Conversely, a flowable mixture contains a relatively low volume of dry constituents, a relatively high volume of water and a relatively high mass of an HRWRA.

For mixing select embodiments of the present invention, equipment for making "stiff" mixtures comprises a shear-type mixer, such as a paddle or star-wheel mixer. These impart high-shear energy to the wetted constituents, readily converting them into a cement-based paste, albeit a stiff paste. The greater the shear-imparting energy imparted to the constituents in mixing, the quicker they form into a cement-based paste. For mixing select embodiments of the present invention, equipment for making "flowable" mixtures may be conventional drum-type mixers or the above high-shear mixers.

In select embodiments of the present invention, the process comprises loading dry constituents, including microinclusions and select nanoinclusions, such as microfibers and nanofibers, into the bowl of the mixer and first blending them in the dry state for about ten minutes. The HRWRA and water, and optionally, any colloidal nanoinclusions, are blended separately from the dry constituents and then added to the dry ingredients as the mixer is operating. Mixing continues to yield a homogeneous cement-based paste. In select embodiments of the present invention, the wet mixing may consume an hour depending on the amount of shear energy being imparted to the mixture and the volume of water and mass of the HRWRA added to wet the dry constituents. The mixture becomes a "homogenized" paste when no more individual particles are visible and the components in the mixer have come together as a single mass of cement-based paste having no separately distinguishable components. At this point, for select embodiments of the present invention, macrofibers may be added and blended for ten minutes to allow them to distribute evenly.

In select embodiments of the present invention, the cement-based paste is placed in molds to hydrate (harden). In select embodiments of the present invention, the molding procedure depends on the rheology of the final cement-based paste. Flowable cement-based pastes are placed or poured into molds that contain the cement-based paste until it hydrates.

In select embodiments of the present invention, fluid cement-based paste may be vibrated by placing molds filled with cement-based paste on an external vibrating table and vibrating the mold and cement-based paste as a unit, or by inserting internal vibrators into the cement-based paste and vibrating until it is consolidated. Vibration frees entrapped air voids from the cement-based paste and consolidates solid constituents into a tightly packed configuration.

In select embodiments of the present invention, "stiff" mixtures of the cement-based paste are shaped by pressure molding, extrusion molding, or spin casting. In select embodiments of the present invention, pressure molding comprises rolling or pressing a dough-like cement-based paste into a prepared mold or pressing a dough-like cement-based paste to a given thickness as in the case of making plates or tiles. In select embodiments of the present invention, placing a dough-like cement-based paste into an extruder and applying pressure to force it through the die yields a final molded shape. Extruded product may need to be supported until it hardens to prevent it from changing shape. In select embodiments of the present invention, spin casting involves placing a dough-like cement-based paste along the longitudinal axis of the inside of a mold and spinning the mold at high speed to distribute the cement-based paste evenly over the inside of the mold with the centrifugal force created by the spinning.

In select embodiments of the present invention, the molded, extruded or spun-cast cement-based paste is left in the mold or supported in the extruded or spun-cast shape until it has hydrated. This is normally 24 hours, but may be longer depending on the amount of the HRWRA specified for the formulation. In select embodiments of the present invention, product is not removed from the mold until it has achieved a stiffness that resists deformation under moderate force, such as thumb pressure.

In select embodiments of the present invention, curing may be done by conventional methods such as water curing or by applying a curing compound for the same length of time as conventional cement-based paste is cured. However, conventional curing methods may not yield an optimum combination of strength and toughness. To achieve a desired combination, in select embodiments of the present invention, the hydrated but not fully cured, cement-based paste is heated. In select embodiments of the present invention, prior to heating, the cement-based paste is cured for about seven days in an environment of approximately 100% relative humidity at ambient temperature, approximately 21° C.±3° C. (70° F.±5° F.), submersed in water at approximately 88° C.±3° C. (190° F.±5° F.) for about three to about five days, and heated in air at approximately 88° C.±3° C. (190° F.±5° F.) for about one to about two days. This process configures amorphous calcium silicate hydrate as a structure that is more like a crystalline structure than the original amorphous calcium silicate hydrate.

EXAMPLE

A baseline VHSC mixture for experimental concrete cubes, as given in Table 4 below, was provided for each of a series of 3M® microsphere-enhanced compositions. The microspheres used are 3M® high-strength ceramic microspheres (product description G-800) that are thick-walled spheres of nominal diameter ranging from 0.3-200 microns The microspheres were added to the baseline mixture in percent (by volume) ranging from 0 (baseline) to 12% in 1½% increments. Specimens were cured at 100% relative humidity at 25° C. for seven days, then in hot water @90° C. for four days, and finally in 90° C. air for two days.

TABLE 4

| Baseline VHSC Mix (grams) for Test Cubes | | | | | |
|---|---|---|---|---|---|
| Cement | Sand | Si Flour | Si Fume | HRWRA | Water |
| 1123.78 | 1087.20 | 311.09 | 437.12 | 33.71 | 247.23 |

Refer to the figure for a graph of example test results for the addition of 3M® micro spheres to the above VHSC mixture in amounts from 1½-12% by volume. Upon adding the 3M® microspheres, at an optimum volume percent of microspheres, the ultimate compressive strength of the resultant custom concrete component increases by approximately thirty percent and toughness (not shown separately in the graph) increases by approximately ten percent over that of conventional VHSC. The data for a baseline VHSC are the points 101 along the ordinate (x=0) indicating no microspheres added to the concrete. With additions of 3M® microspheres the average strength of the mixture increases with a maximum average strength occurring at a 6% (by volume) addition of microspheres as indicated at 103 where average strength was 36.9 KSI. This is a 36.5% increase in compressive strength over conventional VHSC. As the percent of microspheres increases from 6% the average strength decreases slightly with the observation that one of the cubes with a 7.5% microsphere content yields at 40.1 KSI as indicated at 102. Although the microinclusions (3M® microspheres) were added as a volume percent in this example, a preferred method when fabricating actual structure, as opposed to test samples, is to provide the microinclusions as a mass percent of the cement used in the formulation.

As shown, select embodiments of the present invention provide a concrete that is both strong and tough for fabricating superior building components. These superior components may be made in any shape through form casting while conventional structural shapes may be made by either mold extrusion or spin-casting.

Select embodiments of the present invention are suitable for fabricating inexpensive structural panels, such as thin concrete armor panels that may be used for vehicles as well as fixed structures. Structural armor panels may be formed or extruded to a thickness heretofore impractical because of the improved toughness and strength of embodiments of the present invention. For example, panels may be produced in size and thickness to accommodate man-portability. These man-portable panels may be configured for attaching to a structural framework to resist penetration of small arms fire and mitigate blast and fragmentation effects.

Military forces use a variety of protective materials ranging from soil cover to expensive, high-performance, lightweight ballistic ceramics. An embodiment of the present invention, configured appropriately, offers an inexpensive solution for force protection in addition to man-portable products. Applications for embodiments of the present invention include but are not limited to:

For the military and government applications: very high performance concrete incorporated in inexpensive ballistic armor; light weight structural shapes such as plates, channels, pipes, tubes, I- and WF-sections; connectors; protective construction; blast-resistant panels; fragmenting munitions protection; vehicle up-armoring; forced entry resistant structural elements and the like.

For commercial users: building construction products, such as roofing tiles, wall panels, floor tiles, and the like; lightweight structural shapes such as plates, channels, pipes, tubes, I- and WF-sections; hurricane and tornado resistant structural elements, forced entry resistant structural elements, and the like.

It is therefore to be understood that within the scope of the appended claims, the invention may be practiced otherwise than as described. Accordingly, all such modifications are intended to be included within the scope of this invention as defined in the following claims.

The abstract is provided to comply with the rules requiring an abstract, which will allow a searcher to quickly ascertain the subject matter of the technical disclosure of any patent issued from this disclosure. 37 CFR §1.72(b). Any advantages and benefits described may not apply to all embodiments of the invention.

We claim:

1. A structure incorporating components of concrete having a combination of strength and toughness to resist blast and penetration by ballistic fragments, said components comprising:
   first constituents, comprising:
      cement of Blaine fineness of about 280 to about 360 m²/kg;
      sand,
      wherein said sand is provided at a mass ratio of about 0.75 to about 1.25 of said cement;
      silica fume,
      wherein said silica fume is provided at a mass ratio of about 0.15 to about 0.4 of said cement;
      silica flour,
      wherein said silica flour is provided at a mass ratio of about 0.15 to about 0.3 of said cement;
      microinclusions,
      wherein said microinclusions are provided at a mass ratio of up to about 0.35 of said cement, and
      wherein said first constituents are mixed to yield a first homogeneous mix;
   second constituents comprising:
      at least one high-range water-reducing admixture; and water,
      wherein said water is provided at a mass ratio of about 0.2 to about 0.35 of said cement, and
      wherein said high-range water-reducing admixture and said water are blended into a second homogenous mix prior to mixing said second homogenous mix with said first homogeneous mix to form a uniform cement-containing paste; and
   macrofibers,
      wherein said macrofibers are provided at a mass ratio of up to about 0.35 of said cement, and
      wherein said macrofibers are blended into said uniform cement-containing paste such that said macrofibers are distributed approximately uniformly in a resultant cement-containing paste, and
      wherein said resultant cement-containing paste is hydrated.

2. The structure of claim 1 further comprising nanoinclusions, wherein said nanoinclusions are mixed with said first constituents to yield said first homogeneous mix.

3. The structure of claim 1 said material for formation of said microinclusions and macrofibers selected from the group consisting of: metals, alloys, steel, synthetics, polymers, natural inorganics, minerals, glass, asbestos, carbon, cellulose, synthetic organics, natural organics, sisal, and combinations thereof.

4. The structure of claim 1 in which said cement is portland cement with a calcium to silica ratio of less than about 3.1.

5. The structure of claim 1 in which said silica fume is at least 96% silica with a maximum carbon content of less than about 4%.

6. The structure of claim 1 in which said silica flour is crushed silica of less than about 40 microns in its longest dimension.

7. The structure of claim 1 in which said macrofibers are of lengths between about 18 to about 38 mm and in diameters between about 0.38 to about 0.63 mm.

8. The structure of claim 1 in which said macrofibers incorporate ends selected from the group consisting of: hooked ends, approximately straight ends, bulbed ends, and combinations thereof.

9. The structure of claim 1 in which said macrofibers have a surface selected from the group consisting of: silica fume bonded to said surface, glass frit bonded to said surface, a roughened surface, and combinations thereof.

10. The structure of claim 1 further comprising mats of steel strands of diameter less than about 2.5 mm affixed to a tensile-load carrying face of said structure.

11. The structure of claim 1 in which said high-range water-reducing admixture comprises polycarboxylates,
   wherein said amount is in the range of about three to about 20 fluid ounces per 100 lb of said resultant cement-containing paste.

12. The structure of claim 1 in which said microinclusions are selected from the group consisting of: fiber microinclusions, spherical microinclusions, polyhedron microinclusions, and combinations thereof.

13. The structure of claim 1 in which said microinclusions have a longest dimension from about one micron to about 150 microns.

14. The structure of claim 1 in which nanoinclusions are included in said first constituents to yield said first homogeneous mix.

15. The structure of claim 14 in which said nanoinclusions are selected from the group consisting of: fiber nanoinclusions, spherical nanoinclusions, polyhedron nanoinclusions, and combinations thereof.

16. The structure of claim 14 in which materials from which said nanoinclusions are fabricated are selected from the group consisting of: carbon nanotubes, colloids, colloidal silica, and combinations thereof.

17. The structure of claim 1 in which materials from which said microinclusions are fabricated are selected from the group consisting of: metals, ceramics, organics, natural inorganics, natural minerals, synthetics, and combinations thereof.

18. The structure of claim 17 in which configurations of said microinclusion materials are selected from the group consisting of: steel shavings, ceramic whiskers, ceramic spheres, mineral fibers, wollastonite, carbon fibers and combinations thereof.

19. The structure of claim 1 in which said cement-containing paste is a stiff dough with approximately zero slump.

20. The structure of claim 1 in which said cement-containing paste is a flowable mixture.

21. The structure of claim 1 in which said components are selected from the group consisting of: plates, channels, pipes, tubes, I-sections, WF-sections, connectors, panels, and combinations thereof.

22. The structure of claim 1 in which said components are employed to fabricate items selected from the group consisting of: vehicle up-armoring, ballistic armor, blast-resistant panels, man-portable panels, thin concrete armor panels, forced entry resistant structural elements, roofing tiles, wall panels, floor tiles, hurricane and tornado resistant structural elements, and combinations thereof.

23. A method of producing a concrete component of a structure, said structure having a combination of strength and toughness suitable to resist blast and to resist penetration by ballistic fragments, comprising:
   mixing first constituents comprising:
      cement of Blaine fineness of about 280 to about 360 m²/kg;
      sand,
      wherein said sand is provided at a mass ratio of about 0.75 to about 1.25 of said cement;
      silica fume,
      wherein said silica fume is provided at a mass ratio of about 0.15 to about 0.4 of said cement;
      silica flour, wherein said silica flour is provided at a mass ratio of about 0.15 to about 0.3 of said cement;
microinclusions,
wherein said microinclusions are provided at a mass ratio of up to about 0.35 of said cement, and
wherein said mixing results in a first homogeneous mix;
mixing second constituents comprising:
  at least one high-range water-reducing admixture; and water,
wherein said water is provided at a mass ratio of about 0.2 to about 0.35 of said cement, and
wherein said mixing of said second constituents results in a second homogenous mix;
mixing said first homogeneous mix with said second homogeneous mix to form a uniform cement-containing paste;
blending macrofibers into said uniform cement-containing paste such that said macrofibers are distributed approximately uniformly in a resultant cement-containing paste;
forming said resultant cement-containing paste in the shape of said component, and
hydrating said formed resultant cement-containing paste.

24. The method of claim 23 in which said forming is done by techniques selected from the group consisting of: spin casting, extrusion molding, pressure molding, pouring into forms, and combinations thereof.

25. The method of claim 23 in which said concrete component is cured by:
  placing in an environment of approximately 100% relative humidity for about seven days at ambient temperature,
  submersing in water of approximately 85° C. to about 91° C. for about three to about five days, and
  heating in air at approximately 85° C. to about 91° C. for about one to about two days,
wherein, said cured concrete component becomes crystalline unlike said concrete components cured under ambient conditions as an amorphous calcium silicate hydrate.

* * * * *